Feb. 4, 1964    A. S. PARKS    3,120,241
PRESSURE CONTROL DEVICES
Original Filed Sept. 8, 1959    3 Sheets-Sheet 3

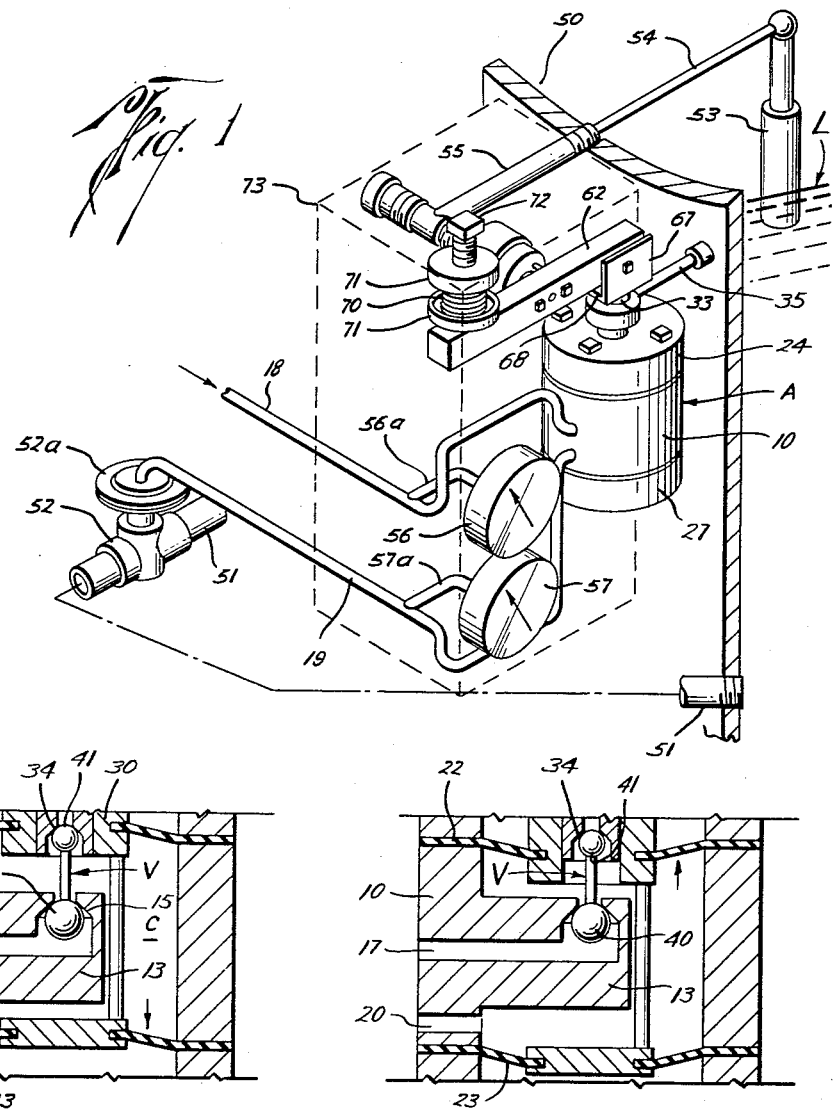

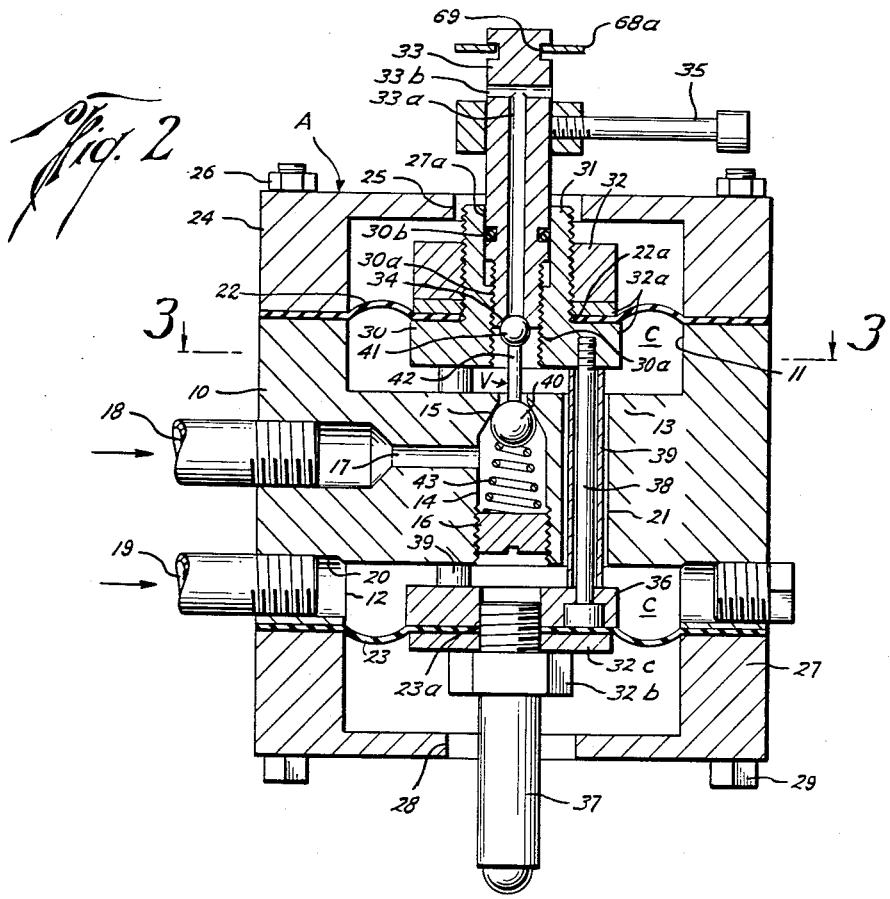
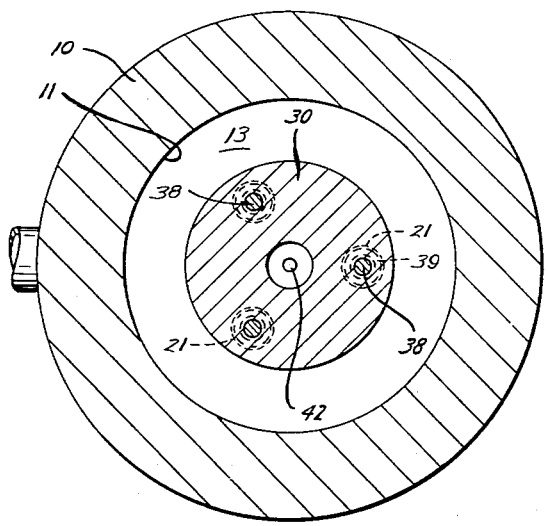

Asbury S. Parks
INVENTOR.
BY Vincent Martin
Jod E. Edwards
M. H. Gay
ATTORNEYS

United States Patent Office 3,120,241
Patented Feb. 4, 1964

3,120,241
PRESSURE CONTROL DEVICES
Asbury S. Parks, Houston, Tex., assignor to Dover Corporation, Tulsa, Okla., a corporation of Delaware
Original application Sept. 8, 1959, Ser. No. 838,548, now Patent No. 3,052,254, dated Sept. 4, 1962. Divided and this application May 28, 1962, Ser. No. 197,936
8 Claims. (Cl. 137—413)

This invention relates to new and useful improvements in pilot pressure control devices.

This application is filed as a division of my co-pending application Serial No. 838,548, filed September 8, 1959, now Patent Number 3,052,254.

In control systems now in general use, the pilot pressure is controlled in accordance with a variable condition or conditions and said controlled pilot pressure is utilized to actuate a unit, such as a valve, which will function to control the primary variable condition. For example, where the liquid level in a vessel is to be maintained within predetermined limits, the variations in said level are employed to control the pilot pressure and such pressure is, in turn, utilized to operate a motor valve in the outlet line extending from the vessel. Other applications and uses for pilot pressure control devices are well known in the art.

One type of pilot pressure control device which is presently being used is the so-called "force-balance" control device. Basically, such a device comprises a diaphragm element associated with a double valve; application of an external force to the system admits pressure against the diaphragm and such pressure acts to "balance" the applied force. A reduction in applied force actuates the valve in an opposite direction to reduce the pressure acting on the diaphragm until said pressure again balances the applied force. In this way, the pilot pressure is controlled in accordance with the force which is applied.

Although generally satisfactory where sufficient force application is available and where only limited operating ranges are required, the usual force-balance type of control device has certain inherent disadvantages. In the first place, the diaphragm area is fixed and this fixes the force to pressure relationship; that is, in a system having a one to one ratio, one pound of force will result in a one pound per square inch change in output pilot pressure. To vary this fixed relationship to render the device more versatile, various types of mechanical linkages and adjusting apparatus have been employed but such arrangements are not only complicated and difficult to manufacture but are not to efficient in operation. Some attempts have also been made to use balancing diaphragms in order to cancel out the effect of the control diaphragm but here again the structure becomes complicated without positive assurance of efficient operation.

It is, therefore, one object of this invention to provide an improved pilot pressure control device which operates efficiently to accurately control the pilot pressure even though the force available to actuate the device is relatively small.

An important object is to provide a pilot pressure control device having an improved type of diaphragm assembly together with simple means for adjusting the assembly, whereby any desired control of the pilot pressure can be effected in response to the application and release of force acting upon the device.

Another object is to provide a control device of the character described, which will accurately maintain the ratio between the applied force and the output pilot pressure over an extremely wide range of operation; said device being adjustable so that it may control a unit such as a motor valve, with a snap action to open and close the valve or where conditions require, may direct a modulated output pressure, which is proportional to the applied force, to said valve to actuate the same with a throttling action.

A particular object of the invention is to provide a control device, of the character described, having an improved diaphragm assembly which is so mounted that the inherent change in effective area of the diaphragm which is the result of moving the central portion of the diaphragm out of lateral alignment with its periphery, is taken advantage of in effecting adjustment of the assembly to thereby control the operation of the device; the particular adjusting arrangement permitting the assembly to be at substantially fully balanced or "zero" position where it is infinitely sensitive to applied force or permitting said assembly to be moved in one direction or the other from said "zero" position to render it a snap-action or a modulating type of control.

Still another object is to provide a control device wherein the diaphragm assembly adjustment is in a linear manner, as distinguished from a step-by-step variation, whereby the change in the operation as it is moved from the so-called "zero" position to maximum position in one direction or the other is accomplished in a gradual or stepless manner.

A particular object of the invention is to provide an improved pilot control device, of the character described, which lends itself to combination with a liquid level responsive means, whereby accurate control of liquid level within a vessel or chamber may be accomplished; the arrangement being such that the liquid level responsive means may be properly and accurately counter-balanced with such counterbalancing being entirely independent of the adjustment of the pilot control device, thereby permitting adjustment of said device to vary the type of operation without affecting or changing the counterbalance of said liquid level responsive means.

A further object is to combine the improved pilot control device with a liquid level responsive actuator, wherein said actuator has a fixed connection to the diaphragm assembly of the device so that the device may be operated either with a snap action which requires application of force in both directions by the actuator, or with a throttling action which requires application of force in only one direction; the actuator having means externally of the vessel or chamber, in which the liquid being controlled is contained, for properly counter-balancing the same to assure sensitive control of the liquid level by the combined action of said actuator and pilot control device.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIGURE 1 is an isometric view of a pilot pressure control device, constructed in accordance with the invention and illustrating the same applied to a liquid level control apparatus;

FIGURE 2 is a transverse, vertical sectional view of the control device and illustrating the diaphragms in balanced or zero position;

FIGURE 3 is a horizontal, cross-sectional view, taken on the line 3—3 of FIGURE 2;

FIGURE 5 is a partial, sectional view showing the diaphragm adjusted to a position which will operate the unit controlled by a control device with a snap-action, and FIGURE 6 is a similar view, illustrating an adjustment thereof which will operate the unit controlled by said control device with a throttling action.

Figure 4:
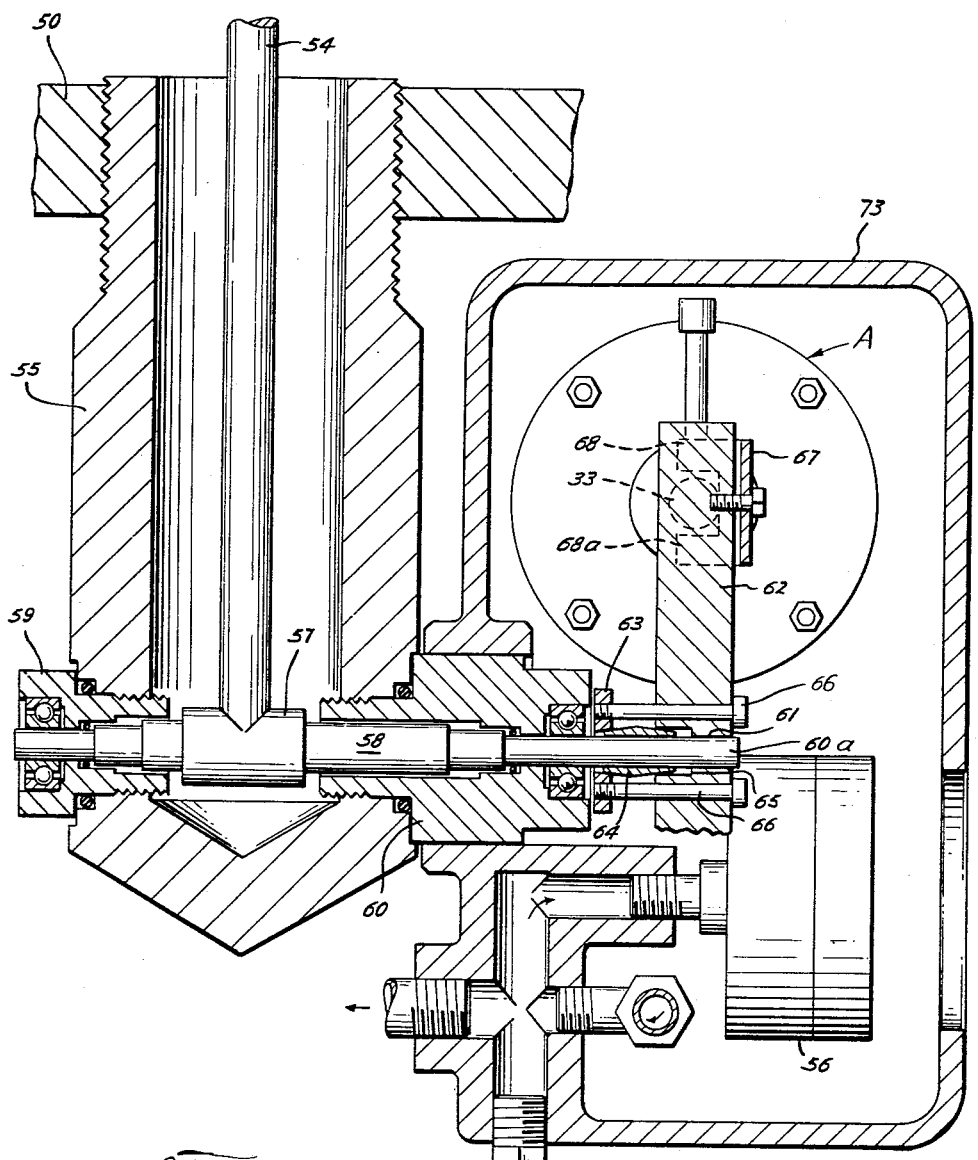
FIGURE 4 is a horizontal, cross-sectional view, taken through the force-applying arm which actuates the pilot control device.

In the drawings (FIGURE 2) the letter A designates the improved pilot pressure control device which includes a main body 10 and which, as will be explained, controls a pilot pressure in accordance with an applied force. The upper portion of the body is recessed at 11 while the lower portion of the body is similarly recessed at 12; the recesses 11 and 12 are separated by the central portion of the body which forms a central partition 13 extending transversely between said recesses. An axial inlet bore or passage 14 extends through the transverse partition or central portion of the body and has a tapered, inwardly facing valve seat 15 adjacent its upper end. The open upper end of said axial inlet passage communicates with the recess 11 while the lower end thereof is closed by a plug 16. The body is provided with a radial inlet port 17 which has its outer end in communication with a source of pilot pressure through a pilot pressure inlet line 18; the inner end of said port extends to the inlet passage 14, whereby pilot pressure may be conducted to the passage and then to the upper recess 11 of the body. Communicating with the lower recess 12 of the body is a pilot pressure outlet line 19, said latter line being connected with and extending from a radial outlet port or opening 20 formed in the body.

The upper and lower recessed portions 11 and 12 of the body communicate with each other through a plurality of passages 21 which extend through the central portion or partition 13 of the body. With the arrangement as illustrated, pilot supply pressure from the inlet port 17 enters the passage or bore 14 and may then flow into the upper recess 11; from this point the pressure may pass through the passages 21 to the lower recessed portion 12 and may be conducted therefrom through the outlet line 19. As will be explained, a valve element V is employed to control the admission of pilot pressure from the inlet line 18 and into the recessed portion 11 and to also control the escape of pressure from this space.

Since the recessed portions 11 and 12 communicate with each other through the passages 21, these spaces in effect form a single pressure receiving chamber C. The upper end of the chamber C is closed by an upper flexible diaphragm 22 while the lower end thereof is closed by a lower flexible diaphragm 23. The diaphragms are of the type generally referred to as "slack" diaphragms and are mounted with their peripheral portions secured to the body whereby their central portions span the recesses. As illustrated, the outer peripheral portion of diaphragm 22 overlies the upper end of the body 10 and is held in position by an annular cap member 24 which has a central opening 25 and which is suitably secured in position by bolts 26. The lower diaphragm 23 has its peripheral portion engaging the lower end of the body 10 and is held thereagainst by an annular end cap 27 having a central opening 28 and secured to the body by bolts 29.

The central portion of the diaphragm 22 is formed with an opening 22a and a clamping block 30 underlies the diaphragm. The block is provided with an integral upwardly extending collar 31 which projects upwardly through a central opening 22a in the diaphragm. The exterior of the collar 31 is threaded and receives a clamping nut 32. A suitable washer 32a is interposed between the clamping nut and the upper side of the diaphragm 22 and when the nut is tightened down, the central portion of the diaphragm 22 is firmly clamped between the block 30 and said nut 32. The clamping block 30 and its integral collar 31 have an axial bore 30a extending therethrough and the lower end of this bore is threaded to receive the lower end of an adjustable control stem 33. The stem extends within the bore and is sealed therewith by a suitable seal 30b. An axial vent passage 33a extends through the adjusting stem from the lower end thereof and terminates in radial vent ports 33b. The lower end of the control stem is formed with an annular valve seat 34 while the outer projecting end of the stem has a suitable operating handle 35 secured thereto whereby rotation of the stem is facilitated. The space beneath the diaphragm 22 is in communication with the vent passage 33a and vent ports 33b and when said passage is open, pressure from this area may escape to atmosphere.

A clamping block 36, similar to the block 30, engages the inner surface of the lower diaphragm 23 and an outwardly projecting stem 37 is threaded into the central portion of the block. Also threaded onto the stem 37 is a clamping nut 32b, a washer 32c being interposed between said nut and the outer surface of the diaphragm 23. The stem 37, of course, extends through a central opening 23a in the diaphragm 23.

The upper and lower diaphragms 22 and 23 are connected together by means of a plurality of connecting bolts 38 which extend through spacer sleeves 39. The sleeves, in turn, project through the passages 21 which are located in the central portion 13 of the body 10. The sleeves 39 properly space the diaphragms from each other while the bolts 38 form a fixed connection between said diaphragms, whereby the diaphragms form a diaphragm assembly which moves as a unitary structure. Since the diaphragms 22 and 23 form the end walls of the chamber C, the inner surfaces of said diaphragms are at all times exposed to and acted upon by the pressure within said chamber.

For controlling the admission of pressure into the chamber C from the inlet line 18 and also for controlling the escape of pressure from said chamber outwardly through the vent passage 33a, the valve element V is provided and its operation is controlled in accordance with the movement of the diaphragm assembly. The valve element V includes a lower ball 40 and an upper ball valve 41 which are connected together in spaced relationship by a valve rod 42. The lower ball valve 40 is larger in diameter than the upper ball valve and is adapted to engage the seat 15 within the upper portion of the inlet passage 14; a relatively light coil spring 43 is confined between the lower end of the ball valve 40 and the closure plug 16 and functions to urge said valve towards its seat. The rod 42 of the valve V projects outwardly through the open end of passage 14 and into the bore 30a of the clamping block 30 and the upper ball valve is adapted to engage the annular seat 34 at the lower end of the adjusting stem 33. The lower valve 40 controls the admission of pilot pressure from the inlet passage into the chamber C and may be identified as the pressure inlet valve; the upper valve 41 controls escape of pressure from said chamber through the vent passage 33a and vent ports 33b in the adjusting stem 33 and will be hereinafter referred to as the vent valve.

With the parts in the position shown in FIGURE 2, the upper ball valve 41 is engaged with seat 34 to close the vent passage; also, the lower ball valve 40 is engaged with the seat 15 of inlet passage 14 to close the same. The position of the diaphragms 22 and 23 is such that said diaphragms extend transversely across the ends of the chamber C at substantially a right angle to the axis of the body. In such position of the diaphragms the pressure which is present within the chamber C is acting substantially equally against the inner surfaces of both diaphragms 22 and 23. Since these diaphragms are of substantially the same cross-sectional area, the pressure is not tending to move the diaphragm assembly in either direction but rather the assembly is in a state of balance. The position of the parts may be referred to as the neutral or zero position since the internal pressure within chamber C is substantially balanced insofar as its effect upon said diaphragms is concerned and is not tending to move the diaphragm assembly in either direction.

With the diaphragms in the neutral or zero position, any force which is applied to the control stem 33 will be applied directly against the stem and against valve element V and is opposed only by the relatively light spring 43. Since the net effective area of the diaphragms is zero, at such time there is no relation between the force applied to the stem 33 and the pressure in C. Any application of force to stem 33 or any decrease of application of force will either unseat valve 40 or 41 to either admit or exhaust pressure from the chamber C; under this condition, the diaphragm assembly is balanced and has no effect on the over-all controlling action. The pressure in chamber C is also present in the outlet line 19 which extends to a unit, such as a motor valve or other pressure-operated device (not shown), to be controlled. In this manner the controlled unit is operated when the force applied to the device A reaches a predetermined or preselected force.

For the purpose of rendering the diaphragm assembly operative in the controlling action, it is necessary to adjust the assembly to an unbalanced condition in one direction or the other. A change in the effective area of each of the diaphragms 22 and 23 with respect to the pressure in chamber C which is acting upon their inner surfaces to thereby control the action of the device in controlling pressure in the chamber C is produced by moving the central portions of said diaphragms in either one direction or the other. As is well known, the effective area of a diaphragm varies as it is cupped, that is, its central portion is moved either toward or away from the pressure which is acting thereon. As the central portion of a diaphragm moves in a direction away from the pressure acting thereon, its effective area decreases and conversely when the diaphragm moves in a direction toward the pressure acting thereon, its effective area increases. Thus by rigidly connecting the diaphragms 22 and 23, a movement of the central portions of the diaphragms will result in changing the effective areas of said diaphragms, which effective areas are presented to the pressure in chamber C. Therefore, the net effective area of the two diaphragms may be changed or varied in accordance with the adjustment of the position of the diaphragm assembly.

In FIGURE 2 the diaphragms are in substantially a horizontal plane, and in such position the diaphragms present substantially the same effective area to the pressure in chamber C. If the diaphragm assembly is moved to the position shown in FIGURE 5 where the central portions of the diaphragms are raised with respect to the peripheral portions thereof, the upper diaphragm 22 is moved in a direction away from the pressure acting thereon while the lower diaphragm is moved in a direction toward the pressure. Thus, the effective area of diaphragm 22 decreases while the effective area of diaphragm 23 increases; in such case the net effective area of the diaphragm assembly is greater in a downward direction, that is, the pressure acting on the assembly is tending to urge the same downwardly as viewed in FIGURE 5.

If the diaphragm assembly is moved to the position of FIGURE 6, the central portions of said diaphragms are moved downwardly with the net effective area of the upper diaphragm 22 increasing and the net effective area of diaphragm 23 decreasing; the net effective area of the assembly is then greater in a direction urging the assembly upwardly in FIGURE 6 By reason of the inherent change in effective area when a diaphragm is moved toward or away from the pressure acting thereon, it is possible to adjust the present diaphragm assembly so that the ratio of the pilot pressure output in chamber C to the force applied to stem 33 may be varied.

For effecting the adjustment of the diaphragm assembly in order to produce the desired operating condition, the control stem 33 is rotated with respect to the upper block 30 of the diaphragm 22. Rotation of the stem adjusts the position of the valve seat 34 with respect to the lower surface of the block 30 and this change in the relative position of seat 34 effects a movement of the central portions of the diaphragms 22 and 30. With the parts in the position shown in FIGURE 2, the body 10, the valve element V and the stem 33 are, in effect, stationary with respect to each other. Rotation of the stem 33 in a direction which will cause the block 30 to move upwardly on the stem, will result in the diaphragm assembly being adjusted to the position shown in FIGURE 5. By rotating the control stem 33 in an opposite direction, the block 30 of the upper diaphragm is moved downwardly with respect to the stem 33 and this causes the diaphragm assembly to be moved to the position shown in FIGURE 6. Therefore, by rotating the stem 33, the diaphragm assembly may be adjusted to obtain the desired controlling action.

Referring back to FIGURE 5 and assuming that the diaphragm assembly has been adjusted to this position, the action of the device will be as follows: The increase of applied force to the outer end of the control stem 33 will be in a direction urging the diaphragm assembly downwardly. As soon as this force is sufficient to unseat the inlet valve 40 and admit additional pressure into the chamber C, this additional pressure acts upon the greater effective area of the lower diaphragm and is added to the applied force which is urging the valve 40 toward open position. This means that the pressure in the control chamber C will build up very rapidly and will operate the unit being controlled by the pilot pressure output through line 19 to be actuated with a rapid or snap action.

When the force being applied to the control stem when in the adjusted position of FIGURE 5 is reversed, the upper vent valve 41 is opened and the pressure within chamber C is exhausted. Immediately after there is a pressure reduction in chamber C, the pressure acting on the greater effective area of the lower diaphragm 23 is reduced and this reduction in pressure acts in the same direction as the force which is urging the stem 33 upwardly and the ultimate result is that there is a continued venting of the chamber which permits a rapid exhaust of pressure so that snap action of the unit being controlled is accomplished.

When the diaphragm assembly is adjusted to the position shown in FIGURE 6 where the effective area of the upper diaphragm is greater, a throttling action of the unit being controlled will be obtained. Any downward application of force to the control stem 33 is in a direction against the greater effective area of upper diaphragm 22 but as soon as this force is sufficient to unseat the valve 40 to admit additional pressure, such additional pressure acting against the greater effective area of diaphragm 22 opposes the applied force and immediately brings the unit back into balance. It is then necessary for additional force to be applied in order to unseat inlet valve 40 but as soon as said valve unseats, the action is repeated to rapidly close the valve and again bring the unit into balance. This results in a gradual building up or incremental increase of the pressure in chamber C in direct proportion to the increase in applied force. Thus, the pressure in chamber C varies with the applied force, with the result that an output pilot pressure modulated in relationship to applied force is directed through line 19 to the unit being controlled. Such modulated pilot pressure operates the unit with a throttling action.

Similarly, when the force applied to the stem 33 with the diaphragm adjusted as in FIGURE 6 is relieved, the vent valve 41 is opened. However, as soon as the valve opens, the pressure against the larger effective area of diaphragm 22 is diminished and the unit comes into balance substantially instantaneously to close said valve. This results in a gradual or incremental reduction of the pressure in the chamber C.

It will be recognized that the illustrations in FIGURES 5 and 6 have been somewhat exaggerated to indicate the limits of adjustment of the diaphragm assembly. It is also obvious that any adjustment between the maximum limits of the diaphragm assembly will provide any desired control of the pilot pressure covering the range from a pressure which will provide for snap action and entirely through a throttling or modulating type of action. In all instances the pressure within chamber C is controlled directly in accordance with applied force. If the force is increased, pressure is increased, but if the force is reduced, then a reduction in pressure occurs. The control has been found extremely accurate and sensitive and the only adjustment required is the rotation of stem 33.

Although the applied force has been described as applied through the control stem 33, it is obvious that force application could be to the stem 37 of the lower diaphragm 23. In such case the applied force will move the diaphragm assembly in a direction opposite to that described above so that actually the operation insofar as pressure increase or decrease is concerned, would be reversed. In other words, increase of applied force to stem 37 would tend to move the diaphragm assembly in a direction unseating the vent valve 41 to reduce pressure in chamber C. Lessening of the force on stem 37 would move the diaphragm assembly in a direction unseating inlet valve 40 and thereby effect an increase in the pressure in chamber C.

The control device A may be employed for controlling the operation of any pressure actuated unit such as a motor operated valve. By transmitting a force to either the stem 33 or the stem 37 which is proportional to the particular condition to be controlled, the device A is actuated to vary the pilot pressure in chamber C and therefore in line 19 in accordance with the applied force. The pressure in line 19, being directly proportional to the applied force which is representative of the condition to be controlled, will actuate the particular unit in accordance therewith.

In FIGURES 1 and 4 the device A has been illustrated as combined with a liquid level control apparatus for controlling the liquid level within a vessel or tank. A portion of the wall of the vessel 50 is illustrated in FIGURE 1 and said vessel contains a liquid, the level L of which is to be controlled. An outlet line 51 extends from the lower portion of the vessel 50 for conducting liquid from the vessel and connected in this line is a motor operated valve 52. The valve includes the usual pressure actuated diaphragm unit 52a at its upper end and the application and release of pressure to the diaphragm unit will open and close the valve to control a discharge of liquid through line 51. A solid float element 53 is suspended within the vessel 50 by means of a float arm 54, which arm extends into and through a supporting housing 55 mounted in the wall of the tank. By means of a connecting assembly, which will be hereinafter described in detail, the movement of float 53 in accordance with liquid level in the vessel 50 will apply a force to the control stem 33 of the device A. The pilot pressure inlet line 18 of the device A may have a suitable gauge 56 connected therein by means of a gauge pressure line 56a. The outlet pressure line 19 which extends from the chamber C of the control device has connection with the diaphragm unit 52a of the valve 52, and this outlet line may also have an indicating gauge 57 connected thereto by a gauge line 57a. The provision of the gauges provides the operator with information as to the pressure in the inlet line 18 and the outlet line 19.

With the float 53 engaged by the liquid in the vessel or tank 50, and assuming the valve 52 to be open to allow flow of liquid from the vessel, a lowering of the level of said liquid within the tank will result in a change in the buoyancy and an effective increase in the weight of the solid float element 53; through the connecting assembly an increased force is applied to stem 33 of the pilot control device A. As explained, an increase in applied force results in an increase in the pressure in chamber C and outlet line 19 of said device A. When sufficient force has been applied to stem 33 by reason of the lowering of the liquid level in the vessel 50 so that the pressure in outlet line 19 increases to a predetermined or pre-selected point, the valve 52 is actuated to move said valve to a closed position and thereby close flow through the line 51.

Thereafter, the level of the liquid in vessel 50 will rise and as it does so its contact with float 53 lessens the effective weight of float 53, with the result that said float applies less force to the control stem 33 of the device A. As explained, the reduction in force being applied to the control stem 33 permits a venting of chamber C to reduce the pressure in said chamber and in the outlet line 19 which is controlling the diaphragm unit 52a of valve 52. When the level has risen to a predetermined point within the vessel 50, the amount of force being applied to the control device A has been reduced to the point where the diaphragm assembly 52a of valve 52 is again actuated, whereby valve 52 is opened. Upon opening of valve 52, liquid may be conducted from the vessel 50 thereby resulting in a lowering of the liquid level so that the operation will be repeated.

Although there are various means by which the float 53 may be connected with the device A so as to apply a force to the control stem 33, the preferred manner of making this connection is illustrated in FIGURE 4. As shown therein, the float is suspended from the float arm 54 which projects axially within the tubular housing 55, said housing having one end threaded into the wall of the vessel 50.

The outer end of the float arm 54 has a collar 57 preferably made integral therewith, and this collar is secured to a transverse shaft 58. The shaft is supported in and suitably sealed with bearing supports 59 and 60 which are threaded through openings in the housing 55. When the float 53 has its effective weight lessened or increased, it will be evident that through the supporting arm 54 a rotation in one direction or the other is imparted to the shaft 58.

The end of the shaft 58 is reduced as illustrated at 60a in FIGURE 4, and said shaft extends through an opening 61 provided in the mid-portion of a force-applying actuator bar 62. The shaft is secured to the bar by means of a clamping plate 63 and a tapered collar 64 and elongate bolts 66. The collar is confined between the plate and a recess 65 formed in the force-applying arm 62, and said bolts 66 extend through said collar and through the bar. With this arrangement, any tendency of rotation of the shaft 58 by reason of a reduction or increase in the effective weight of float 53, due to changes in liquid level, will tend to swing the force-applying arm 63 in one direction or the other to either apply a greater or a lesser force to the control stem 33.

One end of the force-applying arm overlies the upper end of the stem 33 and an angular bracket 67 is secured to this end of the arm. The lower leg 68 of the bracket is recessed to form lugs 68a which are engageable within a groove 69 formed in the upper end of the control stem 33 (FIGURE 2). The bracket 67 provides a simple, effective connection between the control stem and the force-applying arm, and when said arm is moved upwardly, an upward force or pull is applied to stem 33; conversely, a downward movement of the arm 62 applies a downward force to said stem.

For counter-balancing the main portion of the weight of the float so as to render the changes in force application extremely sensitive to changes in liquid level, that end of the arm which is opposite the bracket 67 has a coiled spring 70 acting thereon. The upper and lower ends of the spring are confined in flanged cups 71 and the upper cup is engaged by an adjusting screw 72, this screw being threaded through a suitable opening in an outer housing 73 which is shown in dotted lines. By adjusting the screw 72 more or less spring tension may be applied to the end of the arm, and it is obvious that said spring may be utilized to counterbalance the major portion of the weight of the float assembly. After such counterbalancing has been effected, the force applied to the control stem 33 will be responsive to slight changes in liquid level, whereby sensitive operation is obtained.

It is noted the adjustment of the counterbalancing spring 70 which counterbalances the weight of the solid float element 53 may be accomplished from exteriorly of the vessel in which said float is mounted and such adjustment permits counterbalancing of all or a portion of the weight of said element. Also, adjustment of spring 70 is completely independent of the adjustment of the diaphragm assembly within the device A. As explained, the position of the diaphragms is regulated by rotation of the stem 33 which does not undergo longitudinal or axial movement during the adjustment; as the stem rotates the block 30, having the diaphragms connected thereto, is moved to properly adjusted position. It is therefore possible to change the sensitivity control by adjustment of the diaphragms independently of the balance setting as controlled by the adjustment of the spring 70. This is of decided advantage since the sensitivity control adjusts the operating range while the spring adjusts the liquid level L with respect to the float element 53. Attention is also called to the fact that the actuator bar 62 has the connection at 68 with the stem 33 whereby force in either direction applied to the bar is transmitted to the stem 33 and is effective on the diaphragm assembly when the latter is on control; when the unit is on snap action control, it is necessary that force be applied in both directions, whereas in throttling control only force in one direction is required. The arrangement shown makes the unit applicable to both types of operation.

It is apparent that all or a portion of the effective weight is balanced by the combined force of the spring 70 and the pressure within chamber C acting on the inner surfaces of the spaced diaphragms 22 and 23. When the pressure in the chamber C is changed due to the variation in applied force, as caused by a change in liquid level, this changed pressure is utilized to control the discharge of liquid from the vessel to thereby control the liquid level therein.

In summarizing the use of the device A for liquid level control, any change in the effective weight of the float 53 will result in changes in the force applied to the control stem 33. This action is effected by means of the pivoted force-applying arm 62. As has been explained, an increase in force will result in an increase in pressure in chamber C and outlet line 19, and when such increase is sufficient to actuate the diaphragm unit 52a of valve 52, the valve is closed to prevent further escape of liquid from the vessel 50. Rise of the level in vessel 50 beyond a predetermined point results in reduction of force application to the stem 33, thereby effecting a reduction in pressure in chamber C and outlet line 19 until such time as valve 52 is again actuated and moved to an open position to permit escape of liquid from the vessel to thereby lower the level thereof.

The balance setting of the float is effected by proper adjustment of the spring 70 which is located exteriorly of the vessel; such adjustment determines the position of the solid float element 53 with respect to the level of the liquid and is completely independent of the adjustment of the diaphragm assembly of the device A which latter adjustment controls the sensitivity of said device.

If it is desired that the motor valve 52 be actuated with a snap action so that it will be opened and closed with a relatively rapid movement, the stem 33 is rotated to adjust the diaphragm assembly to the position shown in FIGURE 5. Such adjustment may be made independently of the balance setting and without effecting the latter.

As has been explained, when the diaphragms have been adjusted to the position of FIGURE 5, the application of force when the level reaches a predetermined point in the vessel will result in increasing pressure in the chamber. Because the net effective area of the diaphragm assembly is in a downward direction, the increased pressure will continue to maintain the inlet valve 40 open and the pressure in chamber C and outlet line 19 will rise at a rapid rate whereby the diaphragm unit 52a of the valve 52 is operated with a snap or fast action. Similarly, the release of applied force opens the vent valve and the diminishing pressure acting on the net effective area of the diaphragm assembly will allow the vent valve to be maintained open, whereby the valve 52 is closed with a snap action.

If it is desired to actuate valve 52 with a throttling action, then the diaphragm assembly of the control device A is adjusted as shown in FIGURE 6. In this case, any increase in applied force will increase the pressure in chamber C, but immediately this pressure counterbalances the applied force and closes the inlet valve. Therefore, the pressure in chamber C and outlet line 19 is built up gradually and is modulated to act upon the diaphragm unit 52a of valve 52 to adjust the position of valve 52 and thereby throttle the flow escaping through the line 51. Similarly, in this instance a release or reduction in the applied force will cause the pressure in chamber C and outlet line to be gradually reduced, and thus an overall throttling action of the valve 52 which is under control of the device A is obtained.

It is pointed out that the diaphragm assembly may be adjusted in any desired manner from the zero position shown in FIGURE 2, where it is substantially balanced and insensitive to slight changes in applied force, to the limit of its adjustment in either direction, as shown in FIGURES 5 and 6. At any point between the adjustments which have been shown and described, the action will be somewhere between the snap action and the complete throttling action described above. The adjustment is very simple, requiring only the rotation of the stem 33 to produce the desired action in the valve or unit being controlled. As has been noted, the two diaphragms 22 and 23 are actually connected together as a unitary structure and may be said to float within the body. The peripheral portion of the diaphragm assembly is, of course, secured to the body, but its central portion may be moved axially thereof so that the net effective area of the diaphragm assembly acted upon by the pressure in chamber C may be in either direction; that is, the net effective area of the diaphragm assembly may be added to the applied force, or it may be opposed to the applied force. Where it is added to the applied force, as in the adjustment shown in FIGURE 5, a snap action of the unit being controlled is obtained. Where it is adjusted as in FIGURE 6 to oppose the applied force, then a throttling or modulating type of action is obtained.

The control device A has been illustrated as employed for controlling the liquid level within a vessel, but it is obvious that the control may be combined with motor-actuated valves to produce either a pressure reducing regulator, or a back pressure valve. As has been heretofore pointed out, the applied force may be to either the stem 33 or to the stem 37. The operation would be identical, except that in one case the applied force would produce an increase in pressure in chamber C proportional to such force, whereas in the other case the applied force would produce a reduction in the pressure in chamber C in accordance with said applied force. The unit is relatively simple in construction, comprises a minimum number of parts, and will control over a very wide range.

The foregoing disclosure and description of the invention is illustrative and explanatory thereof and various changes in the size, shape and materials, as well as in the details of the illustrated construction, may be made

What I claim is:
1. A control apparatus including,
a body having a transversely extending central portion provided with an inlet passage,
a diaphragm assembly mounted on the body and comprising a first diaphragm extending transversely of said body on one side of said central portion with its periphery secured to the body and a second diaphragm extending transversely of the body on the opposite side of said central portion and also having its periphery secured to the body,
means connecting the diaphragms together whereby said diaphragms may move as a unit with respect to the body,
means communicating the spaces enclosed by the diaphragms whereby the area between the diaphragms forms a pressure chamber,
said pressure inlet passage having communication with said chamber,
a vent passage extending through one of the diaphragms for venting pressure from the chamber,
valve means coacting with said inlet passage and said vent passage for admitting and exhausting pressure to and from the chamber,
means actuating said valve means in accordance with movement of the diaphragm assembly,
means for applying a force to the diaphragm assembly whereby said assembly is moved in accordance with the differential between the applied force and the pressure in the chamber acting upon said diaphragms,
means associated with the diaphragm assembly for adjusting the diaphragms thereof in a predetermined angular position relative to the body to control the effective area of each diaphragm which is acted upon by the pressure in the chamber,
an outlet pressure line extending from the chamber for conducting the pressure from the control apparatus to a unit to be actuated thereby,
a liquid-containing vessel,
a float element in said vessel and connected with said force-applying means, whereby the applied force is representative of liquid level in said vessel,
and, a pressure-actuated dump valve connected with the vessel and comprising the unit which is actuated by the pilot pressure conducted from the pressure chamber.

2. A control apparatus including
a body having a pressure-receiving chamber formed therein,
a diaphragm assembly carried by the body and comprising a first flexible diaphragm and a second flexible diaphragm,
which diaphragms close the ends of said chamber,
a pilot pressure fluid inlet communicating with the chamber and having its inner open end in substantial axial alignment with the first diaphragm,
an inwardly facing valve seat adjacent said inner open end of the inlet,
a valve element comprising a first ball valve,
a stem and a second ball valve,
said first ball valve being located in the inlet and engageable with the valve seat which limits outward movement of said valve element,
said first diaphragm having a vent passage therethrough,
a valve seat in said vent passage engageable by the second ball valve for controlling flow therethrough,
the spacing between the ball valves being such that in one position both valves are in seated position,
in a second position the first valve is closed with the second valve open,
and in a third position the second valve is closed with the first valve open,
all dependent upon movement of the diaphragm assembly with respect to the inlet within the body,
means for applying an external force to the diaphragm assembly and an outlet pressure line extending from the chamber for conducting the pilot pressure and the chamber to a unit to be actuated thereby,
a liquid-containing vessel,
a float element in said vessel and connected with said force-applying means, whereby the applied force is representative of liquid level in said vessel,
and a pressure-actuated dump valve connected with the vessel and comprising the unit which is actuated by the pressure conducted from the pressure chamber.

3. A control apparatus including,
a body having a pressure-receiving chamber formed therein,
a diaphragm assembly carried by the body and compressing a first flexible diaphragm and a second flexible diaphragm,
which diaphragms close the ends of said chamber,
a pilot pressure fluid inlet communicating with the chamber and having its inner open end in substantial axial alignment with the first diaphragm,
an inwardly facing valve seat adjacent said inner open end of the inlet,
a valve element comprising a first ball valve,
a stem and a second ball valve,
said first ball valve being located in the inlet and engageable with the valve seat which limits outward movement of said valve element,
said first diaphragm having a vent passage therethrough,
a valve seat in said vent passage engageable by the second ball valve for controlling flow therethrough,
the spacing between the ball valves being such that in one position both valves are in seated position,
in a second position the first valve is closed with the second valve open,
and in a third position the second valve is closed with the first valve open,
all dependent upon movement of the diaphragm assembly with respect to the inlet within the body,
means for applying an external force to the diaphragm assembly and an outlet pressure line extending from the chamber for conducting the pilot pressure and the chamber to a unit to be actuated thereby,
said valve seat within the vent passage being adjustable with respect to the passage,
a change in the position of the vent passage valve seat resulting in a change in the position of the central portions of the diaphragms relative to the inlet, whereby the initial angular position of the diaphragms with respect to the body and with both valves seated is controlled,
a liquid-containing vessel,
a float element in said vessel and connected with said force-applying means, whereby the applied force is representative of liquid level in said vessel,
and a pressure-actuated dump valve connected with the vessel and comprising the unit which is actuated by the pressure conducted from the pressure chamber.

4. In combination with a vessel having liquid therein, of a liquid level control apparatus including,
a pivotally mounted support arm extending through the wall of the vessel and having a float element at its inner end which float is suspended in said liquid,
an actuator bar disposed exteriorly of the vessel and having connection with the outer end of the support arm whereby any changes in the effective weight of the float element as caused by changes of the position of the liquid level relative to said float element are transmitted to the actuator bar,
means acting upon the actuator bar for counter-balancing the weight of the float to adjust said float with respect to the liquid level, a discharge line extending from the lower end of the vessel and having a pressure-actuated discharge valve for controlling flow therethrough, a pilot pressure control device located exteriorly of the vessel adjacent said actuator bar for controlling the pressure acting upon the discharge valve to thereby control discharge of liquid from the vessel, and an operating stem forming part of said pilot pressure control device engageable by the actuator bar, whereby force applied by said bar in accordance with changes in effective weight of the float actuates the pilot control device to operate the discharge valve and thereby control the liquid level in the vessel.

5. The combination as set forth in claim 4,
wherein the means for counterbalancing the weight of the float is an adjustable spring element which is accessible from the exterior of the vessel to allow the balance setting to be readily changed,
said spring being independent of the pilot control device.

6. The combination set forth in claim 4,
wherein the pilot pressure control device includes a diaphragm assembly comprising spaced diaphragms defining a pilot pressure chamber and having a valve means connected with the operating stem, whereby application of force to the stem by the actuator bar controls the pilot pressure within the chamber, and means for adjusting the positions of the spaced diaphragms to vary the effective area of each diaphragm which is presented to and acted upon by the pressure in said chamber to vary the action of the discharge valve being controlled,
said means for adjusting the diaphragm positions being entirely independent of the means which counterbalances the weight of the float element.

7. The combination as set forth in claim 6,
together with a fixed connection between the actuator bar and the operating stem of the pilot pressure control device whereby force applied in either direction by said actuator bar is transmitted to said stem.

8. The combination as set forth in claim 4,
wherein the means for counterbalancing the weight of the float is an adjustable spring element which is accessible from the exterior of the vessel to allow the balance setting to be readily changed,
said spring being independent of the pilot control device,
the pilot pressure control device including a diaphragm assembly which comprises spaced diaphragms defining a pilot pressure chamber and having a valve means connected with the operating stem, whereby application of force to the stem by the actuator bar controls the pilot pressure within the chamber, and means for adjusting the positions of the spaced diaphragms to vary the effective area of each diaphragm which is presented to and acted upon by the pressure in said chamber to vary the action of the discharge valve being controlled, said means for adjusting the diaphragm positions being entirely independent of the means which counterbalances the weight of the float element.

References Cited in the file of this patent
UNITED STATES PATENTS
2,867,233    Adelson _____ Jan. 6, 1959